United States Patent
Ferrazzini et al.

(10) Patent No.: US 9,692,634 B2
(45) Date of Patent: Jun. 27, 2017

(54) SYSTEM AND METHOD FOR REGISTRATION OF AN AGENT TO PROCESS MANAGEMENT OBJECT UPDATES

(75) Inventors: Axel Ferrazzini, Toronto (CA); Michael Shenfield, Richmond Hill (CA); James Andrew Godfrey, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 969 days.

(21) Appl. No.: 12/188,925

(22) Filed: Aug. 8, 2008

(65) Prior Publication Data

US 2010/0037238 A1  Feb. 11, 2010

(51) Int. Cl.
- *H04L 12/24* (2006.01)
- *G06F 9/445* (2006.01)
- *H04L 29/08* (2006.01)

(52) U.S. Cl.
CPC ............ *H04L 41/0233* (2013.01); *G06F 8/65* (2013.01); *H04L 67/34* (2013.01); *H04L 41/0213* (2013.01); *H04L 41/046* (2013.01); *H04L 41/0816* (2013.01); *H04L 41/0869* (2013.01)

(58) Field of Classification Search
CPC .................. H04L 63/08; H04L 41/0816
USPC ........................................................ 707/613
See application file for complete search history.

(56) References Cited

U.S. PATENT DOCUMENTS

| | | | |
|---|---|---|---|
| 5,701,458 A | 12/1997 | Bsaibes et al. | |
| 6,308,274 B1 | 10/2001 | Swift | |
| 6,314,434 B1* | 11/2001 | Shigemi et al. | 707/695 |
| 6,363,411 B1* | 3/2002 | Dugan et al. | 709/202 |
| 6,950,819 B1 | 9/2005 | Behera | |
| 7,356,330 B2 | 4/2008 | Whittington et al. | |
| 7,557,736 B1 | 7/2009 | Daily et al. | |
| 2002/0059457 A1* | 5/2002 | Ballard et al. | 709/246 |
| 2003/0009675 A1 | 1/2003 | Rygaard | |
| 2003/0115262 A1* | 6/2003 | Dai | 709/203 |
| 2004/0162818 A1 | 8/2004 | Shaw | |
| 2004/0205142 A1 | 10/2004 | Bahr | |
| 2005/0010585 A1* | 1/2005 | Sahinoja et al. | 707/100 |
| 2005/0039178 A1* | 2/2005 | Marolia et al. | 717/168 |
| 2005/0210241 A1 | 9/2005 | Lee et al. | |
| 2006/0031449 A1* | 2/2006 | Hallamaa et al. | 709/223 |
| 2006/0101019 A1 | 5/2006 | Nelson et al. | |
| 2006/0112427 A1 | 5/2006 | Shahbazi | |
| 2006/0143179 A1 | 6/2006 | Draluk et al. | |

(Continued)

FOREIGN PATENT DOCUMENTS

| | | |
|---|---|---|
| EP | 1515571 A2 | 3/2005 |
| WO | 2006039020 A1 | 4/2006 |

OTHER PUBLICATIONS

Schlegel et al., "Towards Autonomous Mobile Agents with Emergent Migration Behaviour", 2006, ACM.*

(Continued)

*Primary Examiner* — Apu Mofiz
*Assistant Examiner* — Sheryl Holland
(74) *Attorney, Agent, or Firm* — Conley Rose, P.C.; J. Robert Brown, Jr.; Albert A. Abbou

(57) ABSTRACT

A method is disclosed for providing an updated management object to an agent. The method includes the agent specifying the updated management object, and a device management client providing the updated management object.

3 Claims, 7 Drawing Sheets

(56) References Cited

U.S. PATENT DOCUMENTS

| | | | |
|---|---|---|---|
| 2006/0190608 A1* | 8/2006 | Sahinoja et al. | 709/227 |
| 2006/0217113 A1 | 9/2006 | Rao et al. | |
| 2006/0253894 A1 | 11/2006 | Bookman et al. | |
| 2006/0272033 A1 | 11/2006 | Paris et al. | |
| 2007/0005600 A1 | 1/2007 | Dutta et al. | |
| 2007/0093243 A1* | 4/2007 | Kapadekar et al. | 455/419 |
| 2007/0106564 A1* | 5/2007 | Matotek et al. | 705/26 |
| 2007/0169093 A1* | 7/2007 | Logan et al. | 717/168 |
| 2007/0294385 A1* | 12/2007 | Kapadekar et al. | 709/223 |
| 2008/0040452 A1* | 2/2008 | Rao et al. | 709/219 |
| 2008/0046583 A1* | 2/2008 | Rao | 709/230 |
| 2008/0070495 A1 | 3/2008 | Stricklen et al. | |
| 2008/0104393 A1 | 5/2008 | Glasser et al. | |
| 2008/0126555 A1* | 5/2008 | Rao | 709/230 |
| 2008/0320588 A1 | 12/2008 | Lipetz | |
| 2010/0121967 A1* | 5/2010 | Keum et al. | 709/229 |

OTHER PUBLICATIONS

Migas et al., "Migration of Mobile Agents in Ad-hoc, Wireless Networks", 2004, IEEE.*

Adler et al., "Applying Moblie Agents to Enable Dynamic, Context-Aware Interactions for Mobile Phone Users", 2001, Springer-Verlag.*

"Mobile Agent Systems", Oct. 2, 2007, National Institute of Standards and Technology (NIST) 2 pages.*

Open Mobile Alliance Ltd.; OMA Device Management Tree and Description; Draft Version 1.2; Jan. 25, 2005; 47 pgs.

Godfrey, James Andrew, et al.; U.S. Appl. No. 12/188,019, filed Aug. 7, 2008; Title: System and Method for Negotiating the Access Control List of Data Items in an Ad-Hoc Network with Designated Owner Override Ability; Specification 31 pgs.; 5 Drawing Sheets (Figs. 1-6).

PCT International Search Report; PCT Application No. PCT/CA2008/001754; Apr. 23, 2009; 3 pgs.

PCT Written Opinion of the International Searching Authority; PCT Application No. PCT/CA2008/001754; Apr. 23, 2009; 4 pgs.

Second PCT Written Opinion of the International Preliminary Examining Authority; PCT Application No. PCT/CA2008/001754; Aug. 19, 2010; 4 pgs.

Blodel, Bernd, et al., "Modelling Privilege Management and Access Control," International Journal of Medical Informatics (2006) 75, pp. 597-623.

Office Action dated Nov. 10, 2010, 17 pages, U.S. Appl. No. 12/188,019, filed Aug. 7, 2008.

PCT International Search Report; PCT Application No. PCT/CA2008/001590; May 11, 2009; 3 pgs.

PCT Written Opinion of the International Searching Authority; PCT Application No. PCT/CA2008/001590; May 11, 2009; 7 pgs.

Sun Microsystems; Solaris System Management Agent Developer's Guide; Part No. 817-3155-11; Nov. 2006; 136 pgs.

Farkas, Csilla, et al.; Making Agents Secure on the Semantic Web; University of South Carolina; Nov./Dec. 2002; 4 pgs.

Hagimont, D., et al.; Hidden Software Capabilities; IEEE; 1996; pp. 282-289.

Final Office Action dated Apr. 13, 2011; 13 pages, U.S. Appl. No. 12/188,019, filed Aug. 7, 2008.

Open Mobile Alliance Ltd.; OMA Device Management Tree and Description; Approved Version 1.2.1; Jun. 17, 2008; 48 pgs.

European Extended Search Report; EP Application No. 08800420.5; Aug. 18, 2011; 6 pages.

Java Community Process; "Device Management for Java Micro Edition"; Draft 0.2d; Aug. 5, 2005; 107 pages.

Java Community Process; "Device Management for Java 2 Micro Edition Use Cases and Requirements"; Draft 0.2a; Aug. 5, 2005; 17 pages.

European Examination Report; Application No. 08800294.4; Nov. 25, 2013; 8 pages.

Open Mobile Alliance Ltd.; OMA Device Management Protocol; Approved Version 1.2; Feb. 9, 2007; 53 pages.

Open Mobile Alliance Ltd.; OMA Device Management Bootstrap; Approved Version 1.2.1; Jun. 17, 2008; 28 pages.

European Extended Search Report; EP Application No. 08800294.4; Jan. 16, 2012; 11 pages.

Canadian Office Action; Application No. 2,732,920; Jul. 11, 2013; 3 pages.

Canadian Office Action; Application No. 2,731,877; Feb. 6, 2013; 3 pages.

Canadian Office Action; Application No. 2,731,877; Feb. 18, 2014; 2 pages.

Canadian Office Action; Application No. 2,731,877; Dec. 14, 2015; 4 pages.

European Examination Report; Application No. 08800294.4; Sep. 16, 2015; 8 pages.

Canadian Office Action; Application No. 2,731,877; Feb. 3, 2015; 3 pages.

Canadian Office Action; Application No. 2,731,877; Jan. 11, 2017; 3 pages.

* cited by examiner

US 9,692,634 B2

SYSTEM AND METHOD FOR REGISTRATION OF AN AGENT TO PROCESS MANAGEMENT OBJECT UPDATES

BACKGROUND

The Open Mobile Alliance (OMA) Device Management (DM) specification supports extensions called Management Objects (MOs), which are logical collections of related pieces of data stored in a virtual DM tree. A device that supports OMA DM typically has an embedded OMA DM client that acts as an intermediary between MOs and the applications, functions, agents, or other software or firmware components on the device that might make use of the MOs to configure their services. Any such component will be referred to herein as an agent.

Each MO on a device typically contains data related to a specific agent or type of agent on the device. For example, an email MO might contain data associated with an email agent. If multiple email agents are installed on a device, each might use a separate email MO, or they might all use the same email MO. All of the MOs and agents on a device typically interact via a single DM client.

As used herein, the term "device" might in some cases refer to mobile devices such as mobile telephones, personal digital assistants, handheld or laptop computers, and similar devices that have telecommunications capabilities. In other cases, the term "device" might refer to devices that have similar capabilities but that are not transportable, such as fixed line telephones, desktop computers, set-top boxes, or network nodes. The term "device" can also refer to any hardware or software component that can terminate a communication session.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
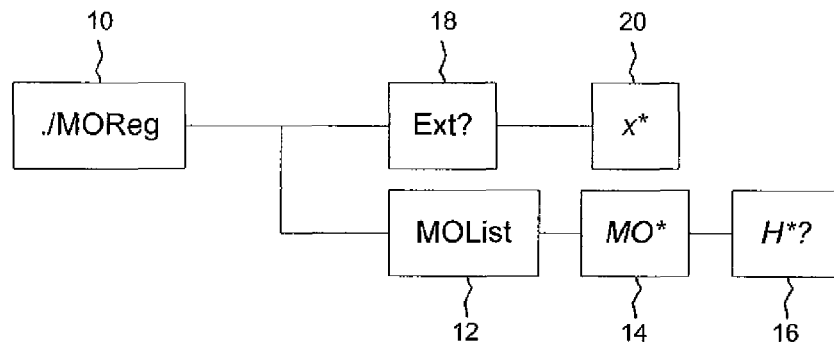
FIG. 1 is a diagram of a generic management object according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an embodiment, a method is disclosed for providing an updated management object to an agent. The method includes the agent specifying the updated management object, and a device management client providing the updated management object.

In another embodiment, a device is provided that is configured to utilize an updated management object. The device includes a processor, an agent configured to send a command requesting the updated management object, and a device management client configured to receive the command and to send the updated management object to the agent.

The MOs on a device and the agents that use those MOs are typically associated with one another at or near the time the agents are installed on the device or the MOs are downloaded to the device. However, when multiple MOs and multiple agents are installed on a device, the DM client may not know which MOs are related to which agents. Also, when an MO is updated, an agent that uses that MO may not be aware of the update.

In an embodiment, an MO is provided that contains a list of the other MOs installed on a device and the agents that are associated with those MOs. Every MO on the list is provided with an identifier by which it can be located. This allows the DM client to know which MOs are related to which agents and where to find the MO for each agent.

In one embodiment, the agents can perform a registration process, described in detail below, with the DM client. Then, when an MO is updated, the updated MO can be made available to the appropriate registered agent or agents. In some cases, the DM client notifies the registered agent of the update by either sending notification of MO availability or sending the MO itself. The agent then takes appropriate actions to make use of the updated MO, as described below. In other cases, upon MO update, the DM client launches a handler application previously registered by the agent associated with this MO.

In an alternative embodiment, rather than registering with the DM client, an agent can request an updated MO by either sending a message to the DM client or calling an interface of the DM client. Hereinafter, sending a message to the DM client or calling an interface of the DM client will be referred to simply as sending a message to the DM client. As described below, the message can contain an identifier for the requested MO, an identifier for the agent, and, optionally, information about the access rights the agent has to the MO. The DM client can then provide the updated MO to the agent.

FIG. 1 illustrates an embodiment of a generic form of the new management object, which in this example is called MOReg 10. MOReg 10 includes an interior node, which may be mandatory in some embodiments, that designates the only branch of the MOReg sub-tree 10 into which extensions are stored. This node, which is referred to here as MOList 12, lists all of the MOs installed on a device. Under MOList 12 is another interior node, referred to here as MO 14 and which may also be mandatory in some embodiments, that indicates the name and identifier of each MO on the device. As indicated by the asterisk, multiple instances of MO 14 might be present, each of which represents one of the MOs that are installed on the device. Under MO 14 is an optional interior node that is referred to here as H 16. H 16 indicates the name and identifier of the agent that is associated with the attached MO 14. As indicated by the question mark, H 16 is an optional node.

Ext 18 is an optional interior node that generically designates the only branch of the MOReg sub-tree 10 into which extensions can be added, permanently or dynamically. ×20 generically represents these extensions.

Figure 2:
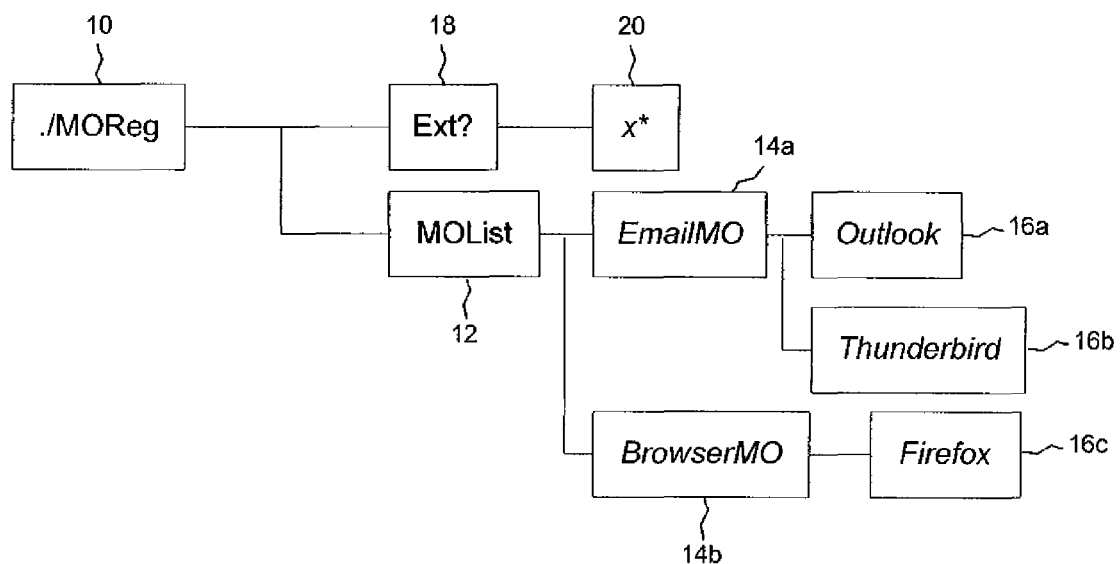
FIG. 2 is a diagram of an example of a specific management object according to an embodiment of the disclosure.

FIG. 2 illustrates an embodiment of a specific form that MOReg 10 might take. In this example, two MOs are present under MOList 12. EmailMO 14a is an MO that might be used by email agents, and BrowserMO 14b is an MO that might be used by browser agents. In this example, EmailMO 14a is being used by two email agents, Outlook 16a and Thunderbird 16b, and BrowserMO 14b is being used by a single web browser agent, Firefox 16c. In other embodiments, other MOs might be present and other agents might be associated with the MOs.

An agent that wishes to access an MO in MOReg 10 (or a similar management object) or wishes to be informed when an updated MO becomes available can do so via the DM client on the device. As used herein, terms such as "updated MO" and the like might refer to an existing MO that has been modified or to a new MO that is intended to replace an existing MO.

Figure 3:
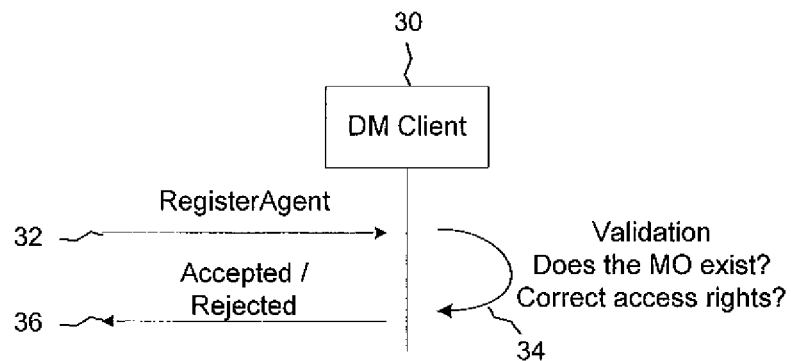
FIG. 3 is a flow diagram for an agent registration procedure according to an embodiment of the disclosure.

As mentioned above, in some embodiments, the agent might register with the DM client before being allowed access to MOReg 10 or before being provided with updated MOs. FIG. 3 illustrates a flow diagram for an embodiment of the agent registration procedure. At event 32, an agent (not shown) sends a registration command, referred to here as RegisterAgent, to a DM client 30. In an embodiment, the RegisterAgent command takes four parameters. One parameter specifies one of two procedures by which an updated MO can be made available to the agent. These procedures, which can be referred to as "direct notification" and "mediated update", will be described in detail below. Another parameter specifies the MO that is the target of the agent's registration request. Another parameter specifies the access rights that the agent possesses for the targeted MO. Another parameter specifies the agent's unique identifier.

Upon receiving the RegisterAgent command, the DM client 30 performs a validation procedure at event 34. That is, the DM client 30 reads the parameters in the RegisterAgent command and determines whether the targeted MO exists and whether the agent has the proper access rights to the targeted MO. At event 36, the DM client 30 accepts or rejects the RegisterAgent command based on the RegisterAgent command parameters.

The following is an example of code that might be used to implement the RegisterAgent command. It should be understood that this is only an example and that other syntax or another XML schema could be used to achieve a similar result.

```
<Get>
   <CmdID>1</CmdID>
   <Item>
      <Target>
         <LocURI>./MOReg/MOList</LocURI>
      </Target>
   </Item>
</Get>
<Results>
   <CmdRef>1</CmdRef>
   <CmdID>7</CmdID>
   <Item>
      <Data>EmailMO, BrowserMo</Data>
   </Item>
</Results>
<RegisterAgent>
   <CmdRef>2</CmdRef>
   <Item>
      <AgentCMD> ExecHandler</AgentCMD>
      <Target>
         <LocURI>./MOReg/MOList/EmailMO</LocURI>
      </Target>
      <MORight>Some authorization information (e.g. predefined credentials, certificate issued by VeriSign, etc.)</MORight>
      <AgentID>AgentUniqueIdentifier</AgentID>
   </Item>
</RegisterAgent>
<Results>
   <CmdRef>2</CmdRef>
   <CmdID>8</CmdID>
   <Item>
      <Data>RegistrationConfirmed</Data>
   </Item>
</Results>
```

In the case when the <MORight> element is empty or missing, there may be no validation performed by the DM Client 30, except for the case when the DM Client 30 has a list of agents/applications "whitelisted" for access to respective MOs.

After an agent has successfully registered with the DM client 30, updated versions of the MOs for which the agent has registered can be made available to the agent via either direct notification or mediated update. In the direct notification procedure, when an updated MO for which the agent has registered becomes available, the DM client 30 sends a notification message to the agent. The agent then takes appropriate actions to retrieve the updated MO.

Figure 4:
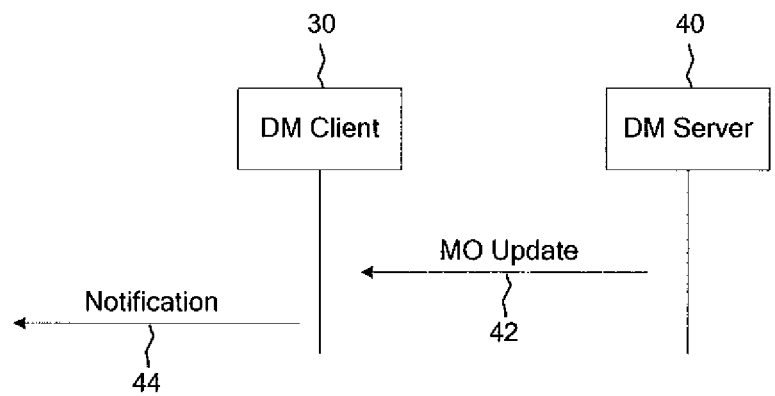
FIG. 4 is a flow diagram for direct notification of a management object update according to an embodiment of the disclosure.

FIG. 4 illustrates a flow diagram for an embodiment of the direct notification procedure. At event 42, a DM server 40 sends an MO update to the DM client 30. The DM server 40 might be any component capable of sending an MO update to the DM client 30. In some cases, the MO update might include an entire MO even when only a portion of the MO has been updated. In other cases, the MO update might include only the updated portions of the MO. When the device for which the MO update is intended is a wireless device, the MO update might be provided as an over-the-air data transmission. Alternatively, the device might be coupled to another component through which a wired data transmission might be made. In other embodiments, the MO update might be transmitted in other manners.

At event 44, after receiving the MO update, the DM client 30 can send a notification message to the agent informing the agent that the updated MO is available. The notification message might be sent to the agent's callback address, uniform resource locator (URL), or other location identifier, which might have been specified during the agent's registration procedure. Upon receiving the notification message, the agent can make use of the updated MO. For example, the updated MO might be an email-related MO that indicates a new email server to which the agent should connect. The agent could take appropriate actions to connect to the new server. Alternatively, the MO itself might be sent as a part of notification. That is, there are two scenarios for "direct notification": notification of [updated] MO availability with and without the MO attached.

The following is an example of code that might be used to implement the direct notification procedure. It should again be understood that this is only an example and that other syntax could be used.

```
<Notification>
   <CmdRef>2</CmdRef>
   <Item>
      <Target>
         <LocURI>./MOReg/MOList/EmailMO</LocURI>
      </Target>
      <Data>MO Updated</Data>
   </Item>
</Notification>
```

The mediated update procedure is the other procedure for making an updated version of an MO available to an agent. In the mediated update procedure, when an updated MO for which the agent has registered becomes available, the DM Client 30 launches a handler application registered by the agent. The handler application might be a component integrated with the agent or might be a standalone component that can communicate with the agent.

Figure 5:
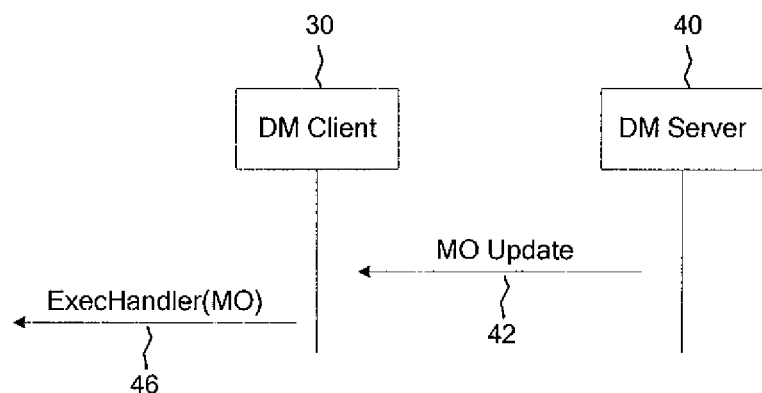
FIG. 5 is a flow diagram for a mediated management object update according to an embodiment of the disclosure.

FIG. 5 illustrates a flow diagram for an embodiment of the mediated update procedure. At event 42, the DM server 40 sends an MO update to the DM client 30 in a manner similar to one of those described above. At event 46, the DM client 30 executes the handler application, referred to here as ExecHandler. In some embodiments, the handler application can act directly on the agent to update the agent's data to a configuration consistent with the updated MO. In other embodiments, the handler application can launch the agent with the updated MO data as startup parameters. In other embodiments, the handler application can store the updated MO data in a shared database to which the agent has access. In still other embodiments, the handler application can notify the agent of the updated MO and the agent can take appropriate steps to retrieve the updated MO.

The following is an example of code that might be used to implement the mediated update procedure. Again, this is only an example, and other syntax could be used.

```
<ExecHandler>
   <CmdRef>2</CmdRef>
   <Item>
      <Target>
         <AgenID>AgentUniqueIdentifier</AgentID>
      </Target>
      <Data>EmailMoContent</Data>
   </Item>
</ExecHandler>
```

Figure 6:
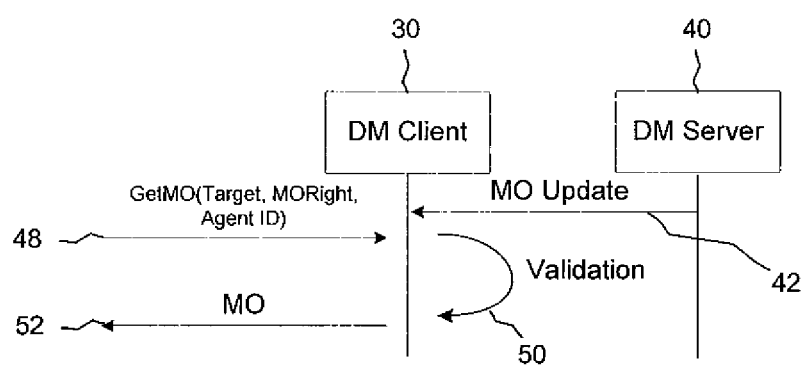
FIG. 6 is a flow diagram for a "pull" method for a management object update according to an embodiment of the disclosure.

In an alternative embodiment, the registration procedure illustrated in FIG. 3 and used prior to the procedures illustrated in FIGS. 4 and 5 is not performed. Instead, the agent can implement a "pull" procedure to request and receive an updated MO. An example of this embodiment is illustrated in FIG. 6, where at event 42, the DM server 40 again sends an MO update to the DM client 30 in a manner similar to one of those described above. After becoming aware of the MO update, the agent, at event 48, sends a command to the DM client 30. Alternatively, the agent may check for updates periodically (e.g., depending on application logic, user requested, schedule based, etc.) and may send the command upon finding that an update is available. The command, referred to here as GetMO, has three parameters. One parameter specifies the updated MO that is being requested, another parameter specifies the access rights that the agent possesses, and another parameter specifies the identity of the agent.

At event 50, the DM client 30 performs a validation procedure on the parameters in the GetMO command. That is, the DM client 30 determines whether the access rights specified in the GetMO command authorize the agent to gain access to the specified MO. If the agent is authorized, the DM client sends the MO to the agent at event 52. In this embodiment, the DM client 30 might send the updated MO to the agent at approximately the time the GetMO command is received.

The following is an example of code that might be used to implement the "pull" procedure. Once again, syntax other than that shown in this example could be used.

```
<GetMO>
   <CmdRef>2</CmdRef>
   <Item>
      <Target>
         <LocURI>./MOReg/MOList/EmailMO</LocURI>
      </Target>
      <MORight>Some authorization information (e.g. predefined credentials, certificate issued by VeriSign, etc.)</MORight>
      <AgentID>AgentUniqueIdentifier</AgentID>
   </Item>
</GetMO>
<Results>
   <CmdRef>2</CmdRef>
   <CmdID>8</CmdID>
   <Item>
      <Data>EmailMOContent</Data>
   </Item>
</Results>
```

In yet another embodiment, the MO itself can contain the Uniform Resource Identifier (URI) of the handler application. In this case, the MO can directly trigger the execution of the handler application. Alternatively, the MO can contain the URL at which the agent is to be notified. In this case, the MO contains an indication of how the agent is to be notified when an updated MO becomes available.

Figure 7:
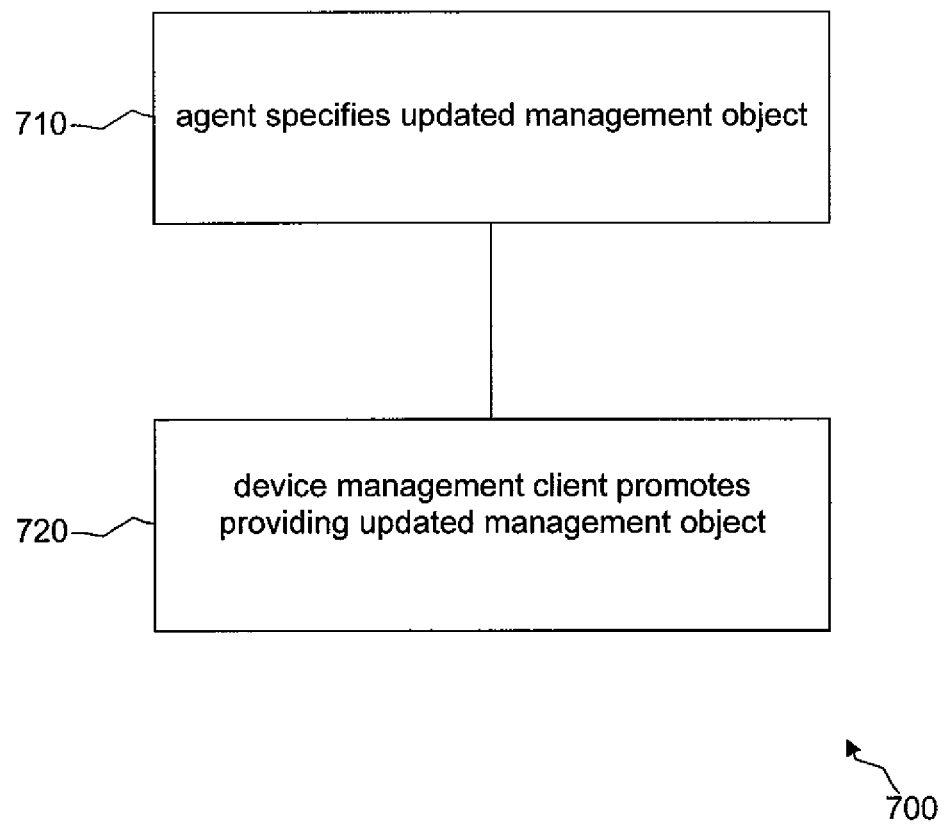
FIG. 7 is a diagram of a method for providing an updated management object to an agent according to an embodiment of the disclosure.

FIG. 7 illustrates an embodiment of a method 700 for providing an updated management object to an agent. At block 710, an agent specifies an updated management object that the agent wishes to utilize. In some cases, the agent specifies the updated management object by registering with the device management client to request the updated management object when the updated management object becomes available. In other cases, the agent specifies the updated management object by sending a command to the device management client requesting the updated management object.

At block 720, a device management client promotes providing the updated management object. In some cases, the device management client might promote providing the updated management object by notifying the agent of the existence of the updated management object. In other cases, providing the updated management object is promoted by an application handler promoting the agent utilizing the updated management object.

Figure 8:
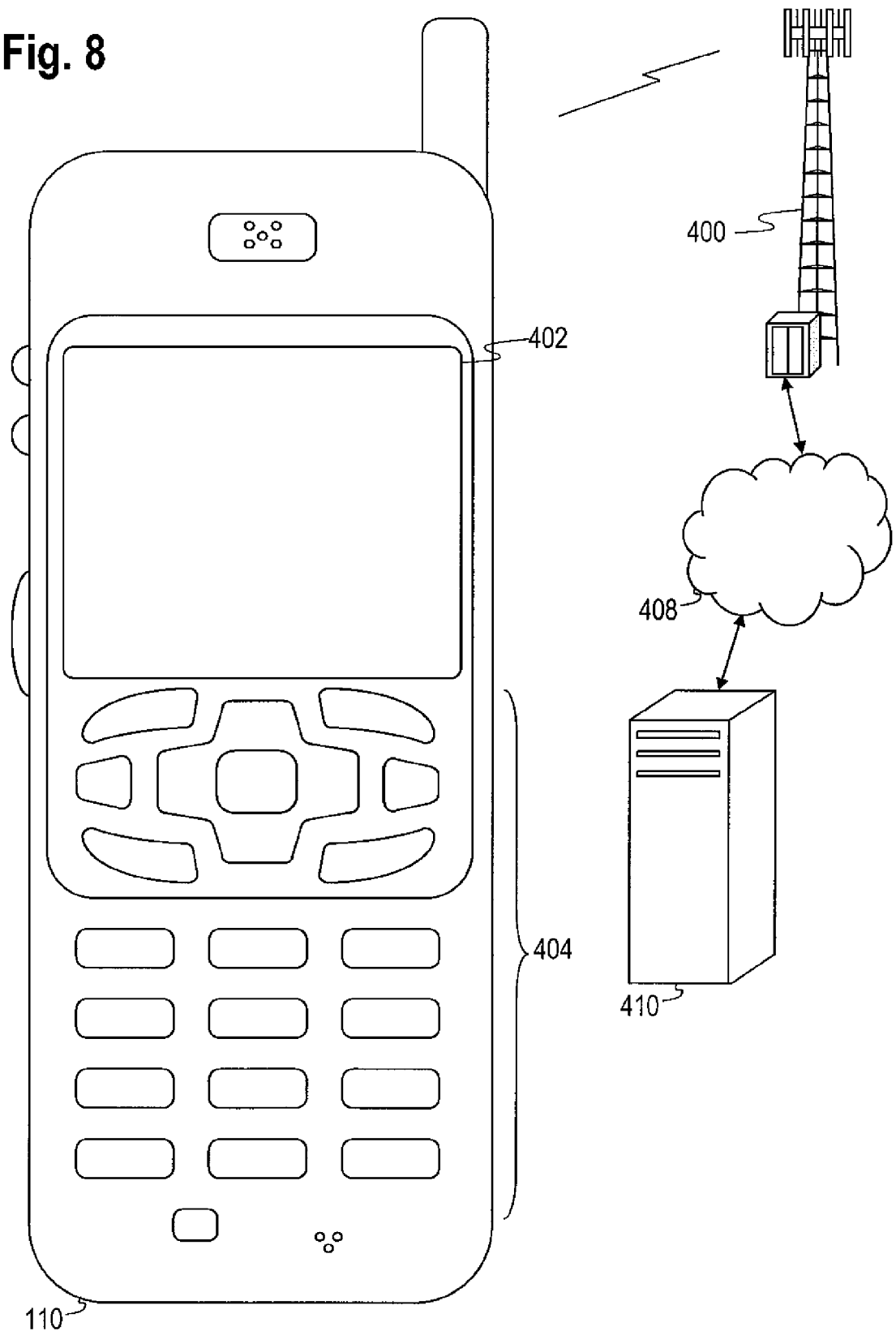
FIG. 8 is a diagram of a wireless communications system including a device operable for some of the various embodiments of the disclosure.

FIG. 8 illustrates a wireless communications system including an embodiment of a typical device 110. The device 110 is operable for implementing aspects of the disclosure, but the disclosure should not be limited to these implementations. Though illustrated as a mobile phone, the device 110 may take various forms including a wireless handset, a pager, a personal digital assistant (PDA), a portable computer, a tablet computer, or a laptop computer. Many suitable devices combine some or all of these functions. In some embodiments of the disclosure, the device 110 is not a general purpose computing device like a portable, laptop or tablet computer, but rather is a special-purpose communications device such as a mobile phone, wireless handset, pager, or PDA. In another embodiment, the device 110 may be a portable, laptop or other computing device. The device 110 may support specialized activities such as gaming, inventory control, job control, and/or task management functions, and so on.

The device 110 includes a display 402. The device 110 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The device 110 may present options for the user to select, controls for the user to actuate, and/or cursors or other indicators for the user to direct. The device 110 may further accept data entry from the user, including numbers to dial or various parameter values for configuring the operation of the device 110. The device 110 may further execute one or more software or firmware applications in response to user commands. These applications may configure the device 110 to perform various customized functions in response to user interaction. Additionally, the device 110 may be programmed and/or configured over-the-air, for example from a wireless base station, a wireless access point, or a peer device 110.

Among the various applications executable by the device 110 are a web browser, which enables the display 402 to show a web page. The web page may be obtained via wireless communications with a wireless network access node, a cell tower, a peer device 110, or any other wireless communication network or system 400. The network 400 is coupled to a wired network 408, such as the Internet. Via the wireless link and the wired network, the device 110 has access to information on various servers, such as a server 410. The server 410 may provide content that may be shown on the display 402. Alternately, the device 110 may access the network 400 through a peer device 110 acting as an intermediary, in a relay type or hop type of connection.

Figure 9:
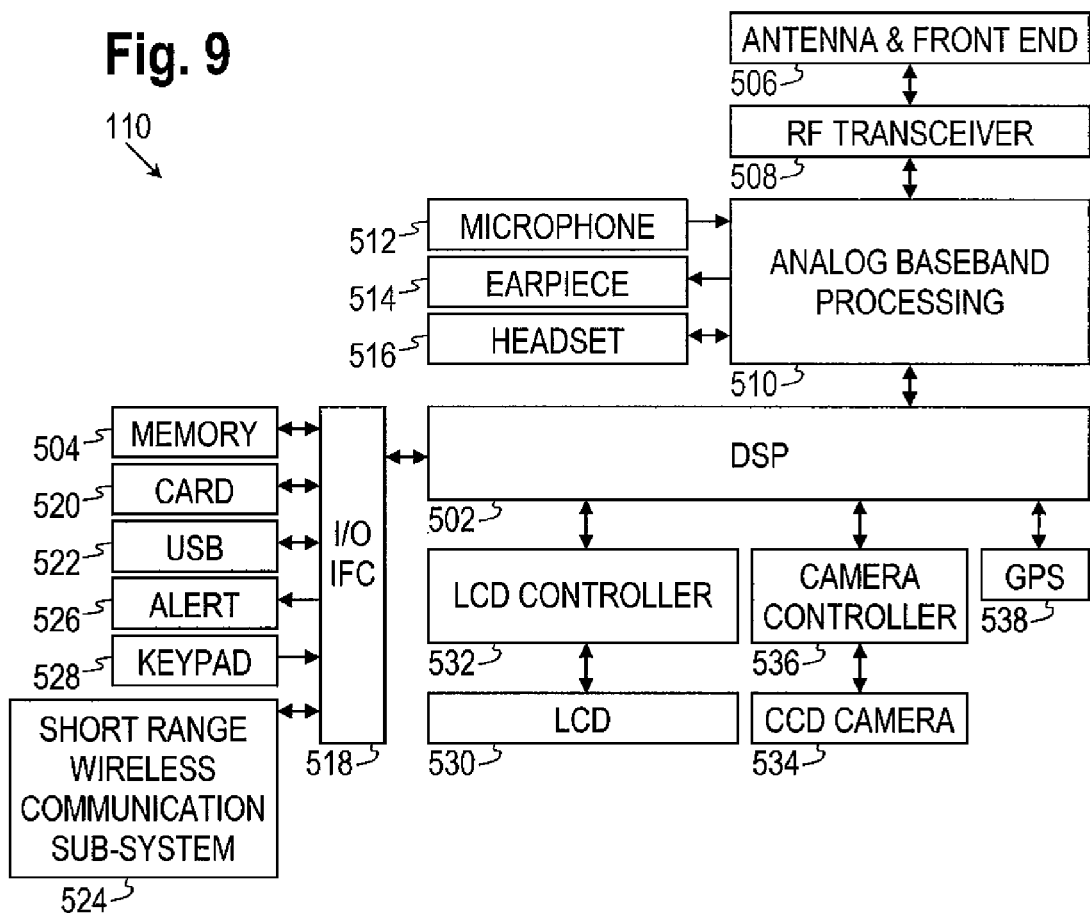
FIG. 9 is a block diagram of a device operable for some of the various embodiments of the disclosure.

FIG. 9 shows a block diagram of the device 110. While a variety of known components of devices 110 are depicted, in an embodiment a subset of the listed components and/or additional components not listed may be included in the device 110. The device 110 includes a digital signal processor (DSP) 502 and a memory 504. As shown, the device 110 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538. In an embodiment, the device 110 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the device 110 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the device 110 to send and receive information from a cellular network or some other available wireless communications network or from a peer device 110. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the device 110 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the device 110 and may also enable the device 110 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the device 110 to communicate wirelessly with other nearby devices and/or wireless base stations.

The input/output interface 518 may further connect the DSP 502 to the alert 526 that, when triggered, causes the device 110 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the device 110. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the device 110 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the device 110 to determine its position. Various other peripherals may also be included to provide additional functions, e.g., radio and television reception.

Figure 10:
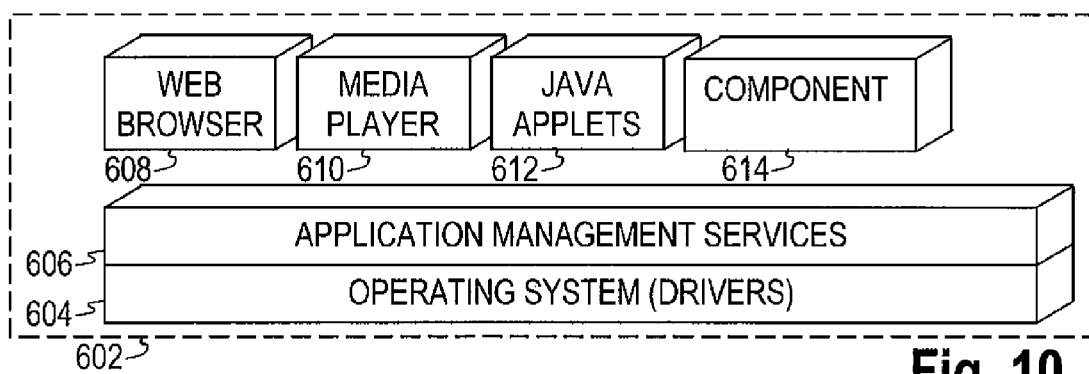
FIG. 10 is a diagram of a software environment that may be implemented on a device operable for some of the various embodiments of the disclosure.

FIG. 10 illustrates a software environment 602 that may be implemented by the DSP 502. The DSP 502 executes operating system drivers 604 that provide a platform from which the rest of the software operates. The operating system drivers 604 provide drivers for the node hardware with standardized interfaces that are accessible to application software. The operating system drivers 604 include application management services ("AMS") 606 that transfer control between applications running on the device 110. Also shown in FIG. 10 are a web browser application 608, a media player application 610, and Java applets 612. The web browser application 608 configures the device 110 to operate as a web browser, allowing a user to enter information into forms and select links to retrieve and view web pages. The media player application 610 configures the device 110 to retrieve and play audio or audiovisual media. The Java applets 612 configure the device 110 to provide games, utilities, and other functionality. Any of these applications might act as the agent described above, or a component 614 might act as the agent.

Figure 11:
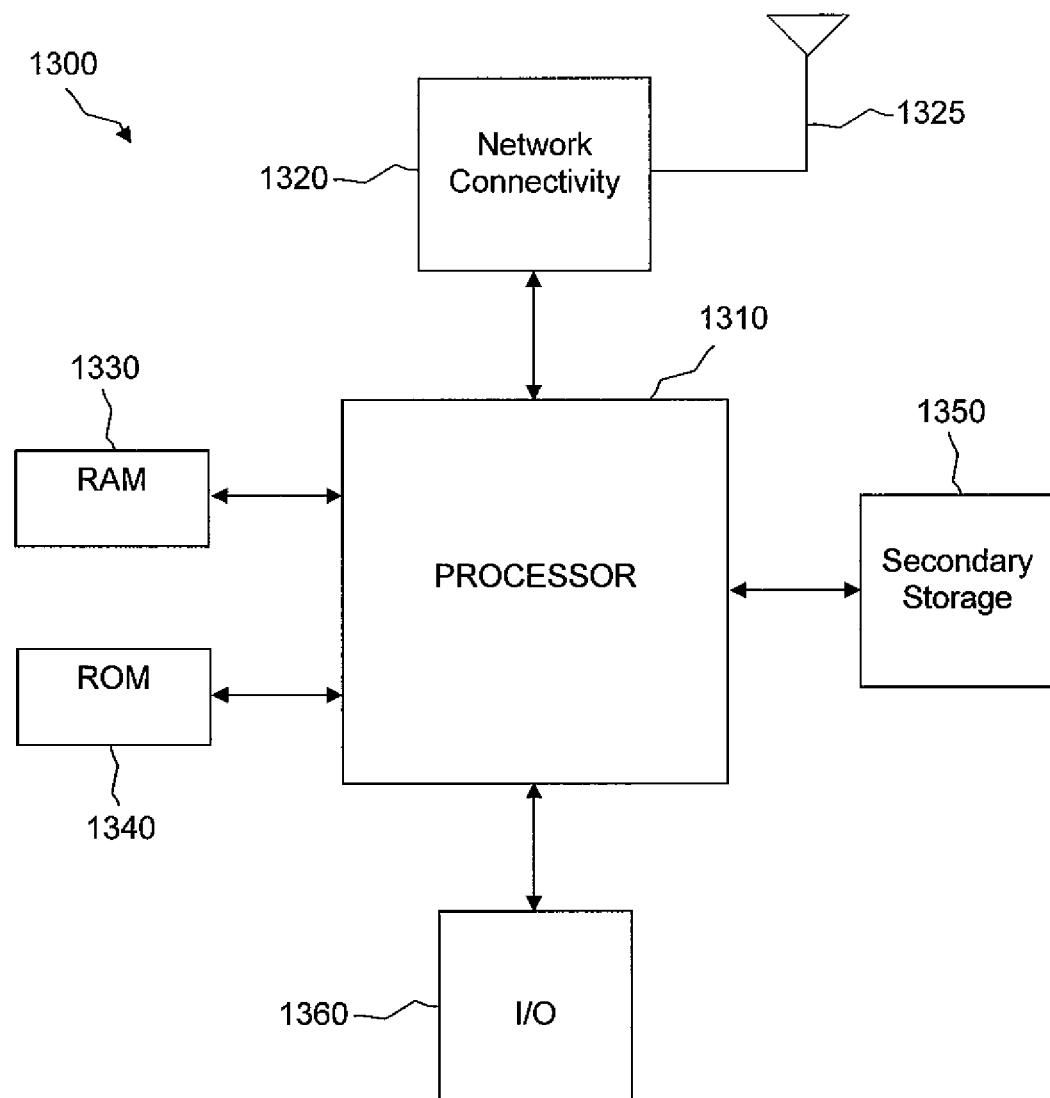
FIG. 11 is an illustrative computing system suitable for some of the various embodiments of the disclosure.

The device 110 and other components described above might include a processing component that is capable of executing instructions related to the actions described above. FIG. 11 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one processor 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) and/or global system for mobile communications (GSM) radio transceiver devices, and other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1325 might be considered to be a component of the I/O devices 1360 instead of or in addition to being a component of the network connectivity devices 1320. Some or all of the I/O devices 1360 may be substantially similar to various components depicted in the previously described drawing of the device 110, such as the display 402 and the input 404.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile device comprising:
   an agent on the mobile device;
   an Open Mobile Alliance (OMA) Device Management (DM) client on the mobile device; and
   a processor configured to execute the agent and the OMA DM client that is configured for:
   receiving, at the OMA DM client, a registration command from said agent, the registration command specifying a Management Object (MO) associated with said agent and managed by the DM client, wherein the agent is configured to operate according to the MO specified in the registration command, and wherein the registration command further indicates a request by the agent to be notified when an updated version of the MO becomes available;
   responsive to an update to the MO, sending from the OMA DM client to the agent, a notification regarding the updated MO;
   initiating an update to a configuration of the agent such that the agent operates according to the updated MO;
   initiating the update to the configuration upon receiving, at the OMA DM client from the agent, a retrieve command responsive to the notification, the retrieve command specifying the updated MO and access rights possessed by the agent and the agent's identity;
   determining whether the access rights specified in the retrieve command authorize the agent to gain access to the MO; and
   communicating, from the OMA DM client to the agent, the updated MO responsive to determining that the agent is authorized to access the MO.

2. A non-transitory tangible computer-readable medium storing instructions which cause execution of a method implemented in a mobile device, the method comprising:
   receiving, at an Open Mobile Alliance (OMA) Device Management (DM) client on the mobile device, a registration command from an agent on the mobile device that is executing the OMA DM client, the registration command specifying a Management Object (MO) associated with the agent and managed by the DM client, wherein the agent is configured to operate according to the MO specified in the registration command, and wherein the registration message further indicates a request by the agent to be notified when an updated version of the MO becomes available;
   responsive to an update to the MO, sending from the OMA DM client to the agent, a notification regarding the updated MO;
   initiating an update to a configuration of the agent such that the agent operates according to the updated MO;
   initiating the update to the configuration upon receiving, at the OMA DM client from the agent, a retrieve command responsive to the notification, the retrieve command specifying the updated MO and access rights possessed by the agent and the agent's identity;

determining whether the access rights specified in the retrieve command authorize the agent to gain access to the MO; and communicating, from the OMA DM client to the agent, the updated MO responsive to determining that the agent is authorized to access the MO.

3. A method implemented in a mobile device, the method comprising:

receiving, at an Open Mobile Alliance (OMA) Device Management (DM) client executing on the mobile device, a registration command from an agent on the mobile device, the registration command specifying a Management Object (MO) associated with the agent and managed by the DM client, wherein the agent is configured to operate according to the MO specified in the registration command, and wherein the registration message further specifies a request by the agent to be notified when an updated version of the MO becomes available;

responsive to an update to the MO, sending from the OMA DM client to the agent, a notification regarding the updated MO;

initiating an update to a configuration of the agent such that the agent operates according to the updated MO;

initiating the update to the configuration upon the OMA DM client receiving a retrieve command from the agent, the retrieve command specifying at least one of a request for the updated MO, access rights possessed by the agent, and the agent's identity;

determining, by the OMA DM client, whether the access rights specified in the retrieve command authorize the agent to gain access to the MO; and communicating, from the OMA DM client to the agent, the updated MO responsive to determining that the agent is authorized to access the MO.

* * * * *